(12) United States Patent
Suzuki

(10) Patent No.: US 7,974,041 B2
(45) Date of Patent: Jul. 5, 2011

(54) HARD DISK DRIVE BASE HAVING A DEPRESSION FORMED BY PRESSING WITHOUT CUTTING

(75) Inventor: Satoru Suzuki, Aikoh-gun (JP)

(73) Assignee: NHK Spring Co., Ltd., Kanagawa-Ken (JP)

( * ) Notice: Subject to any disclaimer, the term of this patent is extended or adjusted under 35 U.S.C. 154(b) by 961 days.

(21) Appl. No.: 11/884,744

(22) PCT Filed: Feb. 23, 2006

(86) PCT No.: PCT/JP2006/303239
§ 371 (c)(1),
(2), (4) Date: Aug. 21, 2007

(87) PCT Pub. No.: WO2006/090765
PCT Pub. Date: Aug. 31, 2006

(65) Prior Publication Data
US 2008/0168484 A1    Jul. 10, 2008

(30) Foreign Application Priority Data

Feb. 23, 2005   (JP) ................................. 2005-047307

(51) Int. Cl.
*G11B 5/012* (2006.01)
*G11B 17/02* (2006.01)

(52) U.S. Cl. ................ 360/97.01; 360/99.08; 29/603.03

(58) Field of Classification Search .... 360/97.01–99.12; 29/603.03
See application file for complete search history.

(56) References Cited

U.S. PATENT DOCUMENTS

| | | | | |
|---|---|---|---|---|
| 5,373,407 A | * | 12/1994 | Stupak et al. | 360/99.08 |
| 6,204,996 B1 | | 3/2001 | MacLeod | |
| 7,587,813 B2 | * | 9/2009 | Miyamori | 29/738 |
| 2004/0221444 A1 | | 11/2004 | Fujii et al. | |

FOREIGN PATENT DOCUMENTS

| | | |
|---|---|---|
| JP | 08-153386 | 6/1996 |
| JP | 9-120669 | 5/1997 |
| JP | 2000-152550 | 5/2000 |
| JP | 2003-348805 | 12/2003 |
| WO | WO-94/09487 | 4/1994 |

* cited by examiner

*Primary Examiner* — A. J. Heinz
(74) *Attorney, Agent, or Firm* — Jordan and Hamburg LLP

(57) ABSTRACT

The base improves manufacturing efficiency and yield and has an advantage in cost. The base includes a panel having a through-hole, a motor holder, having a cylindrical shape that protrudes from a first face of the panel in a thickness direction of the panel, integrally formed on the panel corresponding to the through-hole, the motor holder holds a motor fitted to an inner circumferential surface of the motor holder through adhesives, and the motor holder is provided with at least one depression pressure-formed on the inner circumferential surface thereof, thereby eliminating cutting processing, facilitating accuracy control, suppressing nonconformity such as corrosion because no base material is exposed, requiring no measures against burs and the like, improving production capacity and yield, and resulting in cost advantages, too.

16 Claims, 5 Drawing Sheets

HARD DISK DRIVE BASE HAVING A DEPRESSION FORMED BY PRESSING WITHOUT CUTTING

BACKGROUND OF THE INVENTION

The present invention relates to a base for a hard disk drive and method of manufacturing the same.

There is a conventional base for a hard disk drive as shown in FIGS. 5 and 6. FIG. 5 is a plan view of a base used for casing parts of a hard disk drive and FIG. 6 is a sectional view of the base of FIG. 5.

As shown in FIG. 5 and FIG. 6, a base 101 for a hard disk drive has a recess 103 for mounting a motor and a through-hole 105 formed at the center of the recess 103.

The motor has a spindle passed through the through-hole 105 of the recess 103 of the base 101 and is fixed to the recess 103 by screws and the like. However, fixing work using screws and the like. is complicated and needs a large number of parts.

In contrast, there is a base as shown in FIG. 7. FIG. 7 is a sectional view partly showing a base 107 on which a motor 115 is mounted. The base 107 of FIG. 7 has a through-hole 109 and a motor holder 111. The motor holder 111 is formed by press and has a cylindrical shape communicating with the through-hole 109. The motor holder 111 includes two depressions 113 each having an annular shape formed by circumferentially cutting on the inner circumferential surface thereof. The motor holder 111 holds the motor 115 fitted and fixed via adhesive 117 to the inner circumferential surface thereof.

The solidified adhesive 117 engages with the depressions 113. This enables to easily and securely fix the motor 115 to the motor holder 111 without using screws and the like.

Under this structure, however, the depressions 113 must be cut additionally after press-forming the motor holder 111. This requires high dimensional accuracy to improve the machining accuracy. Namely, the quality of the base 107 greatly depends on the press accuracy, requiring highly sophisticated technique for press accuracy control.

If the cutting is carried out after plating treatment of the base 107, the base material of the motor holder 111 is exposed at the treated surface. This causes fatal adverse effect such as corrosion affecting the hard disk drive performance. Therefore, attention to the fatal adverse effect is required.

The cutting generates burrs, so measures against the burrs are also required.

As this result, manufacturing efficiency and yield of the hard disk drive may be lowered, to have a disadvantage in cost.

Patent Literature 1: Japanese Patent Application Laid-Open Publication No. 09-120669
Patent Literature 2: Japanese Patent Application Laid-Open Publication No. 08-153386

SUMMARY OF THE INVENTION

A problem solved by the invention is that highly sophisticated technique for accuracy control, attention to deficiencies such as corrosion causing fatal adverse effect which affects a hard disk drive performance and measures against burrs are required and manufacturing efficiency and yield are lowered to have disadvantage in cost.

In order to accomplish the object, the present invention is mainly characterized by at least one depression pressure-formed on an inner circumferential surface of a motor holder.

A base for a hard disk drive according to the present invention includes a motor holder having at least one depression pressure-formed on an inner circumferential surface thereof, so that it requires no cutting for forming a depression and enables to facilitate accuracy control, and suppress deficiencies such as corrosion, because no base material is exposed. In addition to this, no measures against burrs also are required. Consequently, the base can improve manufacturing efficiency and yield of the base and the hard disk drive and have an advantage in cost.

BRIEF DESCRIPTION OF THE DRAWINGS

FIG. 1 shows a finished base for a hard disk drive according to an embodiment of the present invention in which

DETAILED DESCRIPTION OF THE INVENTION

The present invention improves manufacturing efficiency and yield of a base and a hard disk drive and has an advantage in cost by pressure-forming depressions on a motor holder of a base for a hard disk drive.

First Embodiment

Base for a Hard Disk Drive

Figure 1A:
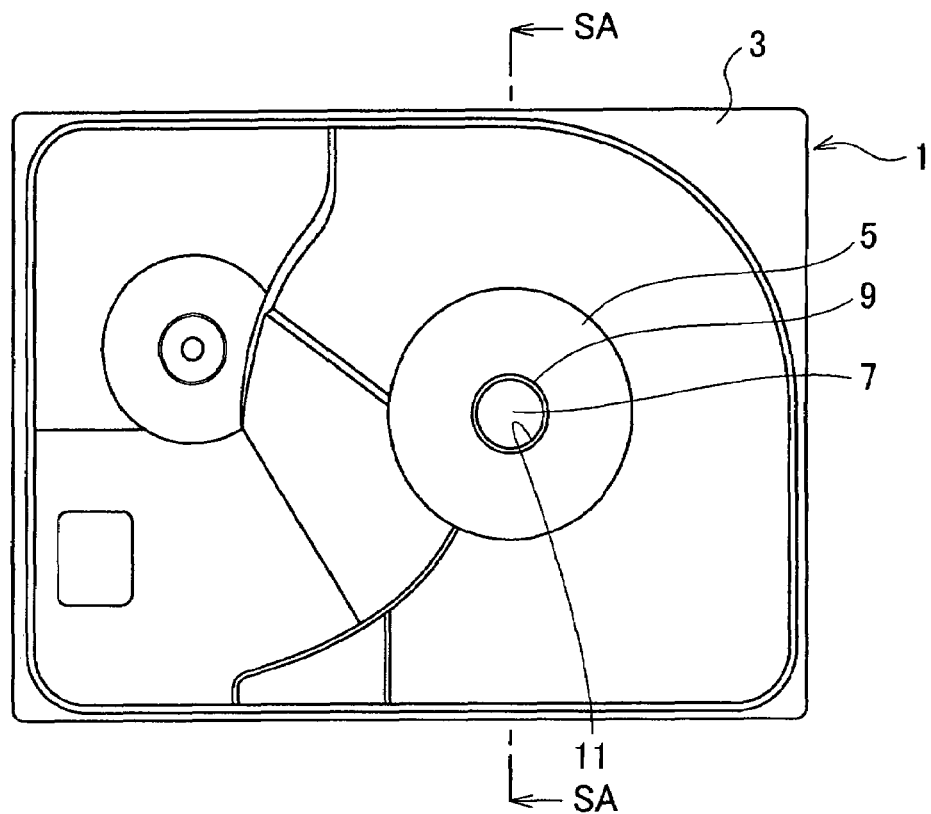
FIG. 1(a) is a plan view of the base.
Figure 1B:
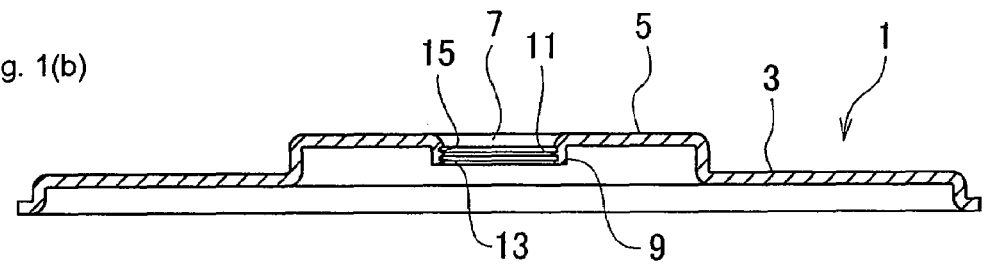
FIG. 1(b) is a sectional view taken along a line SA-SA of FIG. 1(a)
Figure 1C:
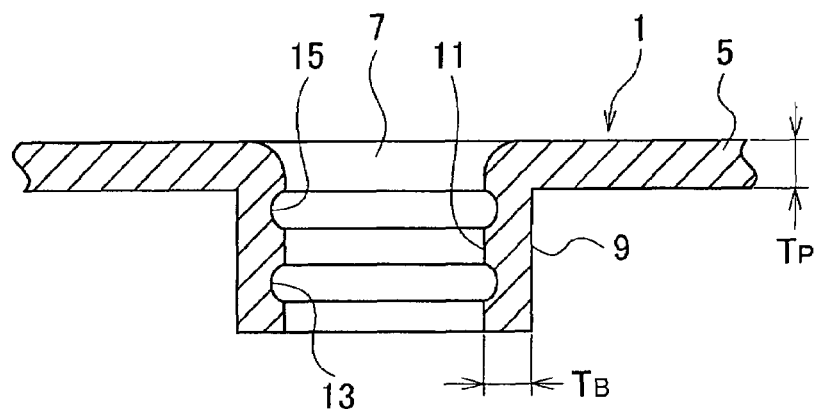
FIG. 1(c) is an enlarged sectional view partly showing the base of FIG. 1(a).

FIG. 1 shows a finished base 1 for a hard disk drive according to an embodiment of the present invention in which FIG. 1(a) is a plan view of the base 1, FIG. 1(b) is a sectional view taken along a line I-I of FIG. 1(a), and FIG. 1(c) is an enlarged sectional view partly showing the base of FIG. 1(a).

The base 1 includes a panel 3 made of, for example, SPCE which is a cold-rolled steel sheet for deep drawing as a kind of SPC material. The panel 3 is shaped by press and has a circular protrusion 5 and a through-hole 7. The protrusion 5 has a circular shape in a plan view of FIG. 1(a) and protrudes from a second face, opposite to a first face, of other portion of the panel 3 in thickness direction of the panel 3. The circular through-hole 7 is punched at the center of the protrusion 5. The panel 3 includes a motor holder 9 integrally formed on the panel 3 for holding a motor for the hard disk drive corresponding to the through-hole 7. The motor holder 9 has a cylindrical shape with a circular shape in a cross section, communicating with the through-hole 7. The motor holder 9 protrudes from a first face of the protrusion 5 of the panel 3 in a thickness direction of the panel 3 with a specified height. The motor holder 9 has a thickness TB which is slightly thinner than the thickness TP of the panel 3 by ironing at the time of press.

The motor holder 9 has grooves 13 and 15 serving as depressions on the inner circumferential surface 11 thereof. The grooves 13 and 15 are formed by pressure-forming such as press. Each of the grooves 13 and 15 has an annular shape along the inner circumferential surface 11 of the motor holder 9. Namely, the grooves are circumferentially formed. The grooves 13 and 15 are separated from and parallel with each other in the height direction of the motor holder 9. According to the present embodiment, therefore, two grooves 13 and 15 as a plurality of depressions are provided in sequence in the height direction of the motor holder 9. The grooves 13 and 15 of the present embodiment have substantially same shape, depth, and width.

Figure 7:
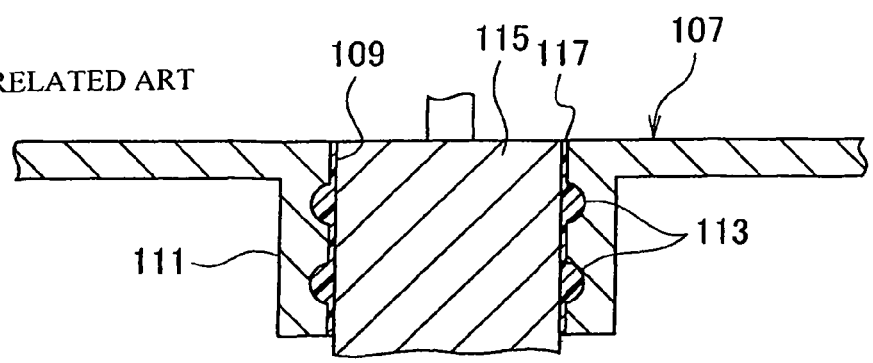
FIG. 7 is an enlarged sectional view partly showing a base for a hard disk drive mounting a motor according to another related art.

According to the present embodiment, the motor holder 9, as is the case of FIG. 7, holds a motor for the hard disk drive fitted and fixed to the inner circumferential surface 11 thereof through an adhesive (not shown). Since the solidified adhesive, therefore, engages with grooves 13 and 15, the motor can be easily and securely fixed to the motor holder 9 without using any screws and the like.

Manufacturing Method

Figure 2A:
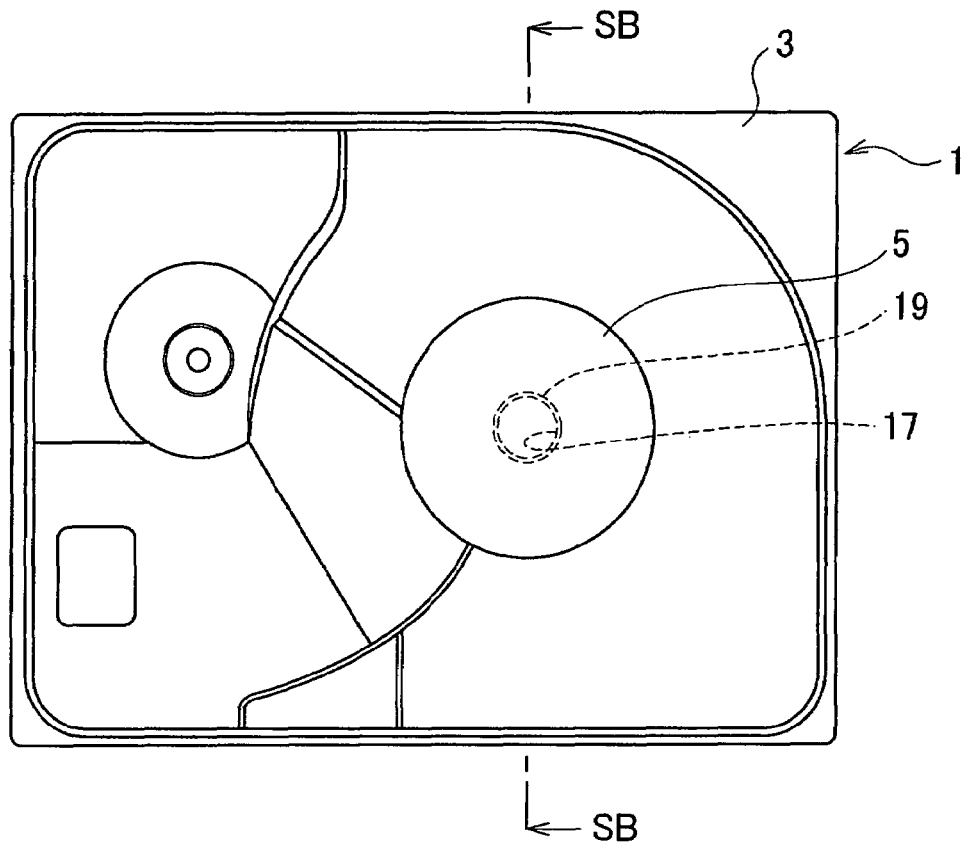
FIG. 2(a) is a plan view showing a panel after forming semi-formed depressions according to the embodiment.
Figure 2B:
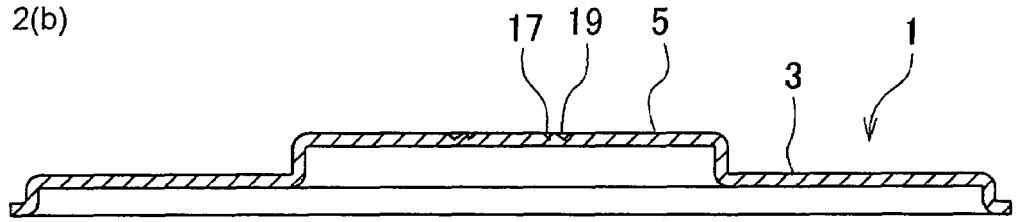
FIG. 2(b) is a sectional view taken along a line SB-SB of FIG. 2(a)
Figure 2C:
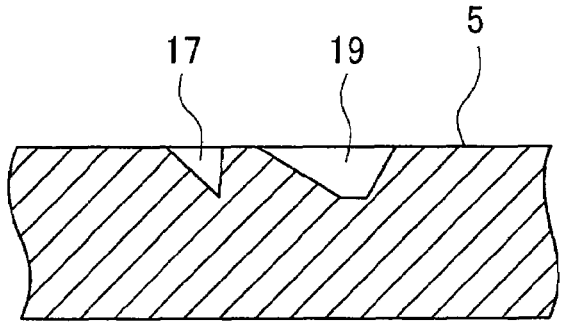
FIG. 2(c) is an enlarged sectional view partly showing the panel of FIG. 2(a).
Figure 3A:
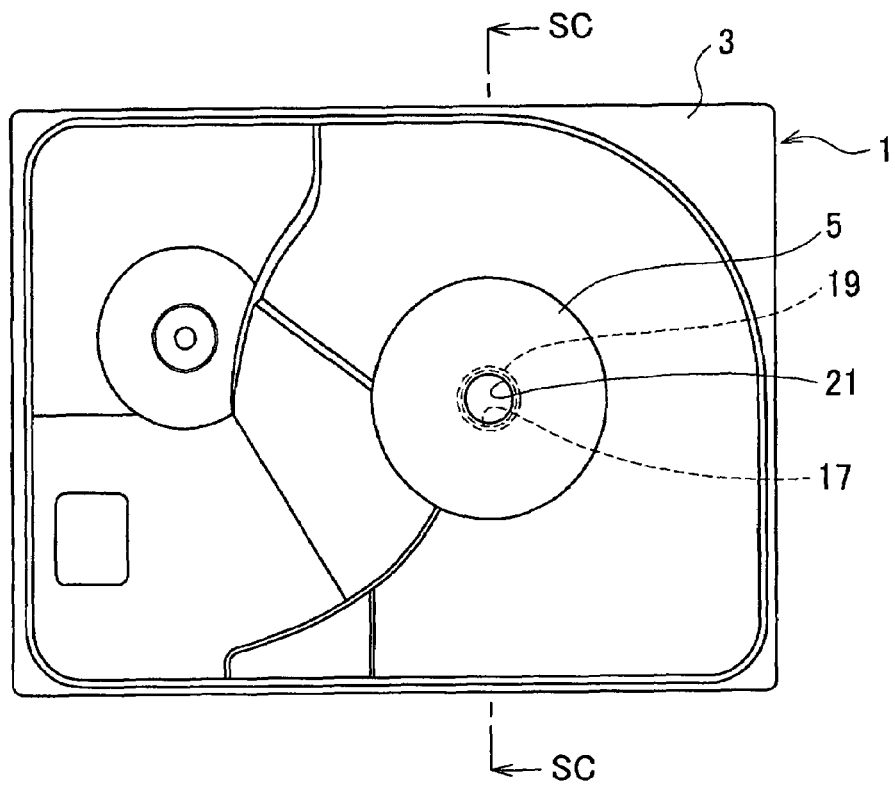
FIG. 3(a) is a plan view showing a panel after the punching process before forming the motor holder.
Figure 3B:
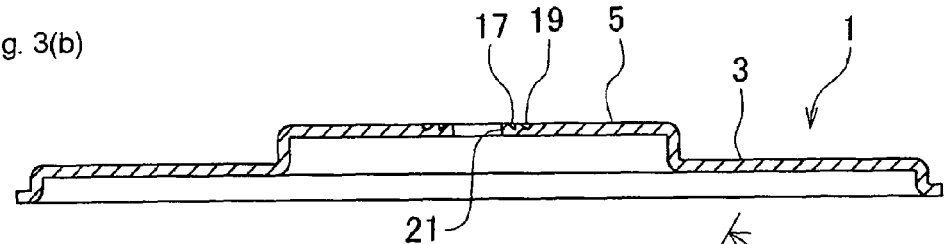
FIG. 3(b) is a sectional view taken on line SC-SC of FIG. 3(a)
Figure 3C:
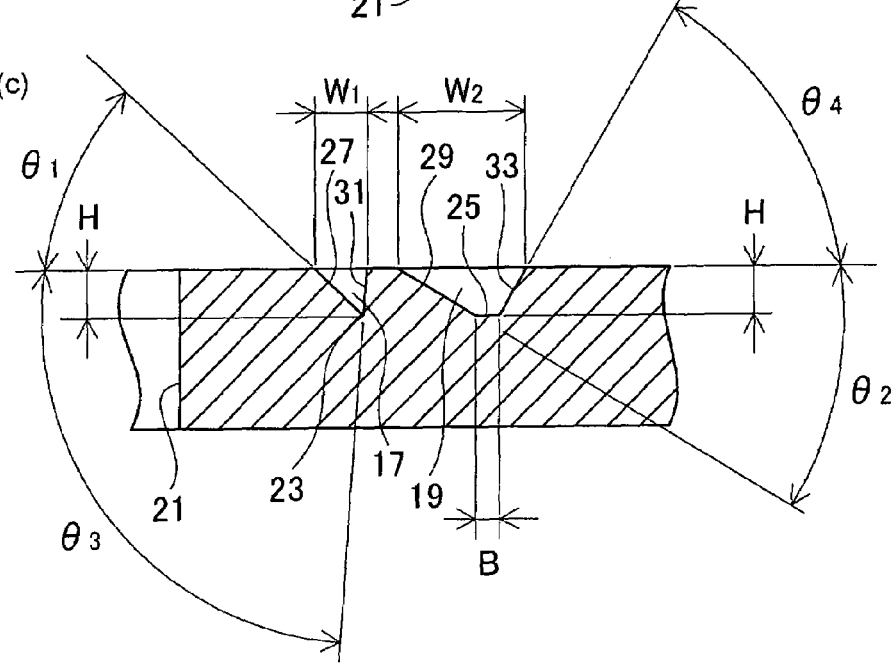
FIG. 3(c) is an enlarged sectional view partly showing the panel.
Figure 4A:
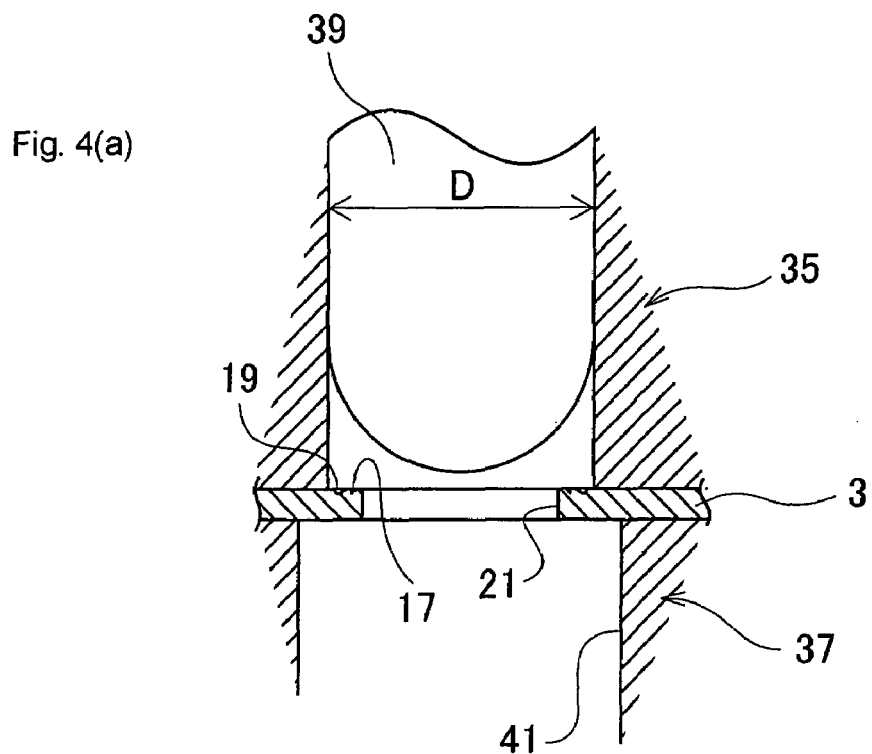
FIG. 4(a) is an enlarged sectional view partly showing the panel and a pressing machine before a press in a holder forming process and FIG. 4(b) is a sectional view after the press.
Figure 4B:
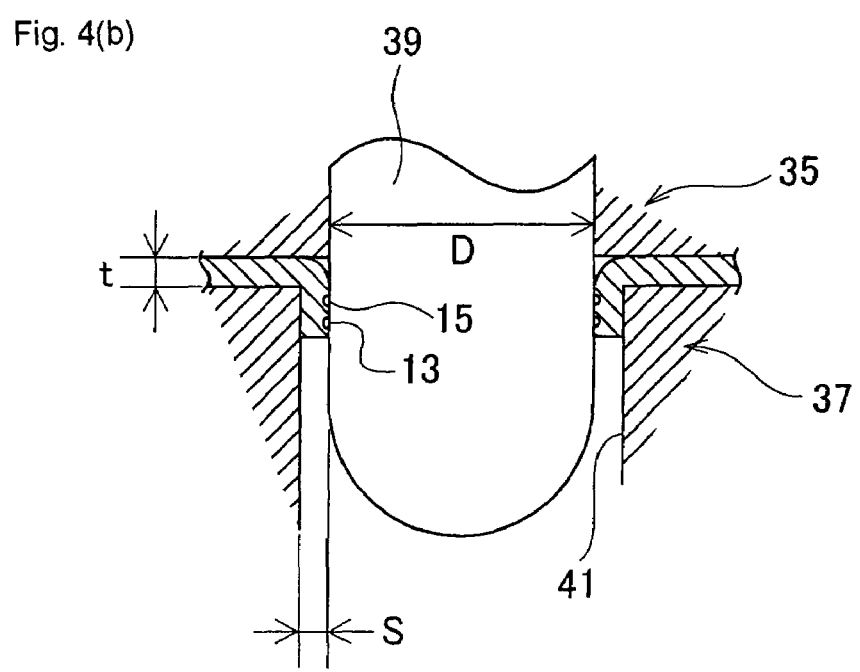
Figure 5:
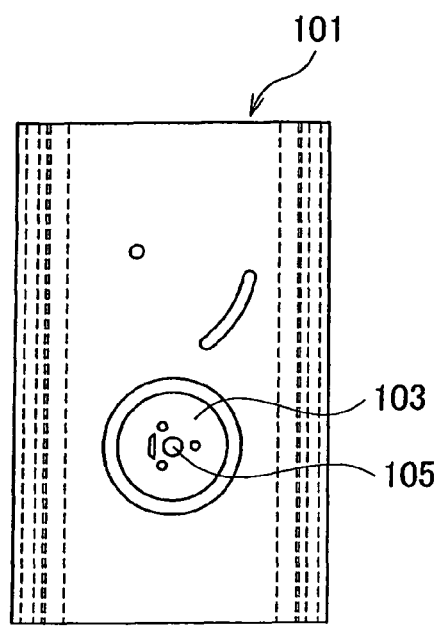
FIG. 5 is a plan view showing a base for a hard disk drive according to a related art.
Figure 6:
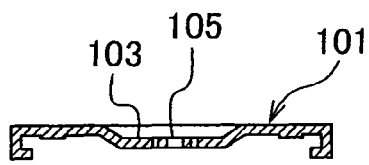
FIG. 6 is a sectional view showing the base of FIG. 5.

FIGS. 2 to 4 relate to a method of manufacturing the base 1 for the hard disk drive. FIG. 2(a) is a plan view showing the panel 3 after forming semi-formed grooves 17 and 19, FIG. 2(b) is a sectional view taken along a line II-II of FIG. 2(a), and FIG. 2(c) is an enlarged sectional view partly showing the panel 3 of FIG. 2(a). FIG. 3(a) is a plan view showing the panel 3 after the punching process before forming the motor holder 9, FIG. 3(b) is a sectional view taken on line III-III of FIG. 3(a), and FIG. 3(c) is an enlarged sectional view partly showing the panel 3. FIG. 4(a) is an enlarged sectional view partly showing the panel 3 and a pressing machine before a press in a holder forming process and FIG. 4(b) is a sectional view after the press.

As shown in FIGS. 2(a) to 2(c) and 3(a) to 3(c), semi-formed grooves 17 and 19 are formed on the protrusion 5 of the panel 3. Then, the panel 3 is pressed as shown in FIGS. 4(a) and 4(b). As this result, the finished grooves 13 and 15 can be formed on the inner circumferential surface 11 of the motor holder 9 as shown in FIGS. 1(a) to 1(c).

The grooves 13 and 15 are formed by a groove semi-forming process corresponding to a depression semi-forming process incorporated into or separated from a series of pressing processes of the base 1.

According to the present embodiment, semi-formed grooves 17 and 19 are formed in the groove semi-forming process as shown in FIGS. 2(a) to 2(c). In the groove semi-forming process, two semi-formed grooves 17 and 19, as a plurality of semi-formed depression, concentric with the center of the protrusion 5 are formed by press as pressure-forming such that the outer semi-formed groove 19 is arranged at outside of the inner semi-formed groove 17.

Then, in the punching process by press, a hole 21 concentric with the semi-formed grooves 17 and 19 is formed on the inside of the semi-formed groove 17 as shown in FIG. 3. The diameter of the hole 21 is set to be smaller than the diameter of a punch used in a motor holder forming process later discussed.

The shape and the size of the semi-formed grooves 17 and 19 have the following relationship. The semi-formed groove 17 has a triangular cross section and the semi-formed groove 19 has a trapezoidal cross section. The bottom 23 of the semi-formed groove 17 has no or least plane. The bottom 25 of the semi-formed groove 19 is a plane of width B. Semi-formed grooves 17 and 19 have inner gentle slopes 27 and 29 and outer steep slopes 31 and 33 opposite to the gentle slopes 27 and 29 in the cross section of FIGS. 2 and 3 respectively.

The gradient angle $\theta_1$ of the gentle slope 27 is greater than the gradient angle $\theta_2$ of the gentle slope of 29 relative to a horizontal line, so that the relationship between the gradient angles $\theta_1$ and $\theta_2$ can be represented with $\theta_1 > \theta_2$. The gradient angle $\theta_3$ of the steep slope 31 is greater than the gradient angle $\theta_4$ of the steep slope 33, so that the relationship between the gradient angles $\theta_3$ and $\theta_4$ can be represented with $\theta_3 > \theta_4$. The relationships between the gradient angles $\theta_1$ and $\theta_3$ of the slopes 27 and 31 and between the gradient angles $\theta_2$ and $\theta_4$ of the slopes 29 and 33 can be represented with $\theta_1 < \theta_3$ and $\theta_2 < \theta_4$, respectively.

The semi-formed grooves 17 and 19 have substantially same depth H in a vertical direction as shown in FIG. 3. The opening width $W_1$ of the inner semi-formed groove 17 is formed to be relatively smaller than the opening width $W_2$ of the outer semi-formed groove 19, and the relationship between the width $W_1$ and $W_2$ can be represented with $W_1 < W_2$.

The differences in size and shape between the semi-formed grooves 17 and 19 are capable of adjusting the size and shape of finished grooves 13 and 15 with the elongation of the panel 3 caused by press at the time of the holder forming process. That is, difference among the gradient angles $\theta_1$ and $\theta_2$ of gentle slopes 27 and 29 and gradient angles $\theta_3$ and $\theta_4$ of steep slopes 31 and 33 and difference between opening width $W_1$ and $W_2$ are provided to bring the sectional shape in the width direction (which is a vertical direction in FIG. 1) of finished grooves 13 and 15 to be symmetrical and to bring finished grooves 13 and 15 to have an equal size and shape after the motor holder 9 is formed. In contrast, if it is allowed to have a difference in size and shape of finished grooves, it may employ semi-finished grooves equal to each other in size and shape having same slope inclinations, opening widths, and depths. In addition, it may employ single semi-formed groove or three or more semi-formed grooves as a plurality of semi-formed grooves, i.e., single finished groove or a plurality of finished grooves. In the case of employing three or more semi-formed grooves, all the inclinations, opening widths, and depths of the semi-finished grooves are set stepwise to be gradually changed toward outside so as to unify the finished grooves after forming the motor holder.

Then, in the holder forming process, the motor holder 9 is formed as shown in FIG. 4 after pressure-forming semi-formed grooves 17 and 19.

The holder forming process is carried out by a pressing machine. The pressing machine includes an upper die 35 and a lower die 37. The upper die 35 is provided with a punch 39 slidably arranged in a hole thereof. The lower die 37 is provided with a hole 41. The punch 39 and the hole 41 are concentrically arranged. The punch 39 lowers as shown in FIGS. 4(a) and 4(b) to the panel 3 grasped between the upper die 35 and the lower die 37 to form the holder 9.

The punch 39 of the upper die 37 has a diameter D which is smaller than that of the hole 41 of the lower die 39. The clearance S as a difference between the punch 39 of the diameter D and a hole 41 of the lower die 37 is set to be smaller than the thickness t of the panel 3 according to the present embodiment, the clearance S is set to about 0.1 mm, for example. Consequently, the panel 3 is ironed between the punch 39 and the hole 41 and the thickness of the motor holder 9 is formed to be thinner than thickness t of other portion.

Because the panel 3 is elongated at the portion of the motor holder 9 due to the holder forming process, the semi-formed grooves 17 and 19 which differ in size and shape from each other as described above becomes finished grooves 13 and 15 which are uniform in size and shape as shown in FIG. 1.

The base 1 after forming the motor holder 9 with grooves 13 and 15 is plated for maintaining the surface cleanliness. Alternatively, the base 1 before forming the motor holder 9 may be plated. Even if semi-finished grooves are formed a plated base, forming the semi-finished grooves by press enables to prevent the base from exposing the base material to maintain the cleanliness of the plated surface. Namely, it may form the semi-finished grooves before and after plating the base.

According to the present embodiment, the grooves 13 and 15 are pressure-formed on the inner circumferential surface 11 of the motor holder 9 by press. Therefore, no cutting is required and accuracy control can be facilitated. Pressure-forming the grooves 13 and 15 by press prevent from exposing the base material unlike cutting grooves, so that deficiencies such as corrosion, etc. are suppressed and no measures against burrs and the like. are required. Consequently, manufacturing efficiency and yield of the base 1 and the hard disk drive can be improved and it can have an advantage in cost.

Each of the grooves 13 and 15 has an annular shape along the inner circumferential surface 11 of the motor holder 9, so that adhesives can be engaged with the grooves 13 and 15 on the entire inner circumference of the inner circumferential surface 11 of the motor holder 9. Therefore, still securely fixing can be achieved.

Two grooves 13 and 15 separated from each other are provided in sequence in the height direction of the motor holder 9, so that adhesives can be engaged at two grooves 13 and 15 and still securely fixing can be achieved.

The motor for the hard disk drive is fixed to the motor holder 9, so that it is possible to suppress deficiencies which exert fatal effects on the hard disk drive performance such as corrosion and outgassing due to gas such as air that remain in blowholes. This enables to assemble the hard disk drive with the cleanliness in a satisfactory condition.

The method of manufacturing the base 1 is provided with the groove semi-forming process in which semi-formed grooves 17 and 19 are pressure-formed by press on the panel 3 and the holder forming process in which the motor holder 9 is formed after pressure-forming the semi-formed grooves 17 and 19 to form grooves 13 and 15 on the inner circumferential surface of the motor holder 9. Therefore, the grooves 13 and 15 can be easily formed on the inner circumferential surface 11 of the motor holder 9 by pressure-forming.

In the groove semi-forming process, the inner and outer semi-formed grooves 17 and 19 are formed concentrically and at the same time, the opening width W1 of the inner semi-formed groove 17 is formed to be relatively smaller than the opening width W2 of the outer semi-formed groove 19. Therefore, the size of grooves 13 and 15 can be formed equally after processing the motor holder 9 with the elongation of the panel 3 due to press of the holder forming process at once.

In the groove semi-forming process, the gradient angles $\theta_1$ and $\theta_3$ of the inner slopes 27 and 29 are smaller than the gradient angles $\theta_2$ and $\theta_4$ of outer slopes 31 and 33 in the semi-formed grooves 17 and 19, respectively. The cross-sectional shape of the grooves 13 and 15 in the width direction (the vertical direction in FIG. 1(c)) can be formed to be symmetrical with the elongation of the panel 3 due to press of the holder forming process.

In the groove semi-forming process, the depth of the inner semi-formed groove 17 may be formed to be relatively larger than that of the outer semi-formed groove 19 on the outer circumferential side.

In the groove semi-forming process, a bottom plane of width equal to the outer semi-formed groove on the outer circumferential side may be employed to the inner semi-formed groove.

At the same time, the inclinations of inner slopes and outer slopes may be set to be same, respectively. In this case, the opening width and depth of finished grooves may be varied.

Grooves 13 and 15 can be processed by pressure-forming using fluid pressure, etc. after forming the motor holder 9.

The depression is only required to engage with adhesives and is not limited to a groove. Namely, it may employ a grid formed from grooves crossing each other, a knurled-surface, and other various forms instead of the groove.

For the base material, SPCC for general purpose and SPCD for drawing may be used as other SPC material instead, and SUS (stainless steel) material instead of SPCE for deep drawing.

What is claimed is:

1. A base for a hard disk drive, comprising:
    a metal panel having a through-hole;
    a motor holder integrally formed on the panel corresponding to the through-hole, having a cylindrical shape that protrudes from a first face of the panel in a thickness direction of the panel, the motor holder holding a motor fitted to an inner circumferential surface of the motor holder through adhesives; and
    at least one depression formed by pressing without cutting on the inner circumferential surface of the motor holder to engage with the adhesive;
    wherein the inner circumferential surface is located on each side of the depression in the thickness direction of the panel and is radially inwardly positioned with respect to a bottom of the depression to fit the motor.

2. The base for a hard disk drive of claim 1, wherein the motor holder has uninterrupted grain flow.

3. The base for a hard disk drive of claim 1, wherein: the depression is circumferentially formed.

4. The base for a hard disk drive of claim 3, wherein: a plurality of the depressions are provided in sequence in a height direction of the motor holder.

5. A manufacturing method of a base for a hard disk drive of claim 4 comprising:
    a depression semi-forming process pressure-forming the semi-formed depression corresponding to the depression, a shape of the semi-formed depression is different from the shape of the depression on the panel; and
    a holder forming process forming the motor holder on the panel after pressure-forming the semi-formed depression, to form the depression on the inner circumferential surface of the motor holder.

6. The manufacturing method of the base for a hard disk drive of claim 5, wherein:
    the depression semi-forming process forms a plurality of semi-formed depressions concentrically arranged at one another, and sets the opening width of the inner semi-formed depression to be relatively smaller than that of the semi-formed depression arranged at outside of the inner semi-formed depression.

7. The manufacturing method of a base for a hard disk drive of claim 6, wherein:
    the depression semi-forming process sets the semi-formed depression to be in a shape of trapezoidal cross section or triangular cross section having an inner and outer slopes opposite to each other in the cross section, and sets the gradient angle of the inner slope to be smaller than that of the outer slope.

8. The manufacturing method of a base for a hard disk drive of claim 5, wherein:

the depression semi-forming process sets the semi-formed depression to be in a shape of trapezoidal cross section or triangular cross section having an inner and outer slopes opposite to each other in the cross section, and sets the gradient angle of the inner slope to be smaller than that of the outer slope.

9. A manufacturing method of a base for a hard disk drive of claim 3 comprising:

a depression semi-forming process pressure-forming the semi-formed depression corresponding to the depression, a shape of the semi-formed depression is different from the shape of the depression on the panel; and a holder forming process forming the motor holder on the panel after pressure-forming the semi-formed depression, to form the depression on the inner circumferential surface of the motor holder.

10. The manufacturing method of the base for a hard disk drive of claim 9, wherein:

the depression semi-forming process forms a plurality of semi-formed depressions concentrically arranged at one another, and sets the opening width of the inner semi-formed depression to be relatively smaller than that of the semi-formed depression arranged at outside of the inner semi-formed depression.

11. The manufacturing method of a base for a hard disk drive of claim 10, wherein:

the depression semi-forming process sets the semi-formed depression to be in a shape of trapezoidal cross section or triangular cross section having an inner and outer slopes opposite to each other in the cross section, and sets the gradient angle of the inner slope to be smaller than that of the outer slope.

12. The manufacturing method of a base for a hard disk drive of claim 3, wherein:

the depression semi-forming process sets the semi-formed depression to be in a shape of trapezoidal cross section or triangular cross section having an inner and outer slopes opposite to each other in the cross section, and sets the gradient angle of the inner slope to be smaller than that of the outer slope.

13. A manufacturing method of a base for a hard disk drive of claim 1 comprising:

a depression semi-forming process pressure-forming the semi-formed depression corresponding to the depression, a shape of the semi-formed depression is different from the shape of the depression on the panel; and a holder forming process forming the motor holder on the panel after pressure-forming the semi-formed depression, to form the depression on the inner circumferential surface of the motor holder.

14. The manufacturing method of the base for a hard disk drive of claim 13, wherein:

the depression semi-forming process forms a plurality of semi-formed depressions concentrically arranged at one another, and sets the opening width of the inner semi-formed depression to be relatively smaller than that of the semi-formed depression arranged at outside of the inner semi-formed depression.

15. The manufacturing method of a base for a hard disk drive of claim 14, wherein:

the depression semi-forming process sets the semi-formed depression to be in a shape of trapezoidal cross section or triangular cross section having an inner and outer slopes opposite to each other in the cross section, and sets the gradient angle of the inner slope to be smaller than that of the outer slope.

16. The manufacturing method of a base for a hard disk drive of claim 13, wherein:

the depression semi-forming process sets the semi-formed depression to be in a shape of trapezoidal cross section or triangular cross section having an inner and outer slopes opposite to each other in the cross section, and sets the gradient angle of the inner slope to be smaller than that of the outer slope.

* * * * *